(12) United States Patent
Tsirkin et al.

(10) Patent No.: US 11,099,874 B2
(45) Date of Patent: Aug. 24, 2021

(54) EFFICIENT USERSPACE DRIVER ISOLATION BY SHALLOW VIRTUAL MACHINES

(71) Applicant: Red Hat Israel, Ltd., Ra'anana (IL)

(72) Inventors: Michael Tsirkin, Lexington, MA (US); Amnon Ilan, Katzir (IL)

(73) Assignee: Red Hat Israel, Ltd., Ra'anana (IL)

( * ) Notice: Subject to any disclaimer, the term of this patent is extended or adjusted under 35 U.S.C. 154(b) by 35 days.

(21) Appl. No.: 16/258,924

(22) Filed: Jan. 28, 2019

(65) Prior Publication Data

US 2020/0241906 A1 Jul. 30, 2020

(51) Int. Cl.
| | |
|---|---|
| *G06F 9/455* | (2018.01) |
| *G06F 9/54* | (2006.01) |
| *G06F 12/1009* | (2016.01) |
| *G06F 9/50* | (2006.01) |
| *G06F 8/65* | (2018.01) |

(52) U.S. Cl.
CPC ............ *G06F 9/45558* (2013.01); *G06F 8/65* (2013.01); *G06F 9/5077* (2013.01); *G06F 9/545* (2013.01); *G06F 12/1009* (2013.01); *G06F 2009/45583* (2013.01)

(58) Field of Classification Search
CPC ...... G06F 9/45558; G06F 8/65; G06F 9/5077; G06F 9/545; G06F 12/1009
USPC .......................................................... 718/1
See application file for complete search history.

(56) References Cited

U.S. PATENT DOCUMENTS

| | | | |
|---|---|---|---|
| 9,384,024 B2 | 7/2016 | Ramakrishnan | |
| 9,400,885 B2 | 7/2016 | Tosa et al. | |
| 9,454,497 B2 | 9/2016 | Nakajima et al. | |
| 2006/0259732 A1* | 11/2006 | Traut ................... | G06F 12/1036 711/173 |
| 2011/0087822 A1* | 4/2011 | Bennett ............... | G06F 9/45558 711/6 |
| 2012/0137292 A1* | 5/2012 | Iwamatsu ........... | G06F 9/45558 718/1 |
| 2016/0179665 A1* | 6/2016 | LeMay .................... | G06F 21/79 711/154 |
| 2016/0299712 A1* | 10/2016 | Kishan .................. | G06F 3/0604 |
| 2017/0123996 A1* | 5/2017 | Kishan ................ | G06F 12/0284 |

(Continued)

FOREIGN PATENT DOCUMENTS

CN 107479946 12/2017

*Primary Examiner* — John Q Chavis
(74) *Attorney, Agent, or Firm* — Lowenstein Sandler LLP

(57) ABSTRACT

Technology for configuring and executing a shallow virtual machine to enhance memory protection between different portions of user space memory of a particular computing process. An example method may involve: associating a computing process with a virtual machine data structure, wherein the computing process initiates an update to the virtual machine data structure to cause a processor to switch between a page table structures; loading first and second executable code into user space memory of the computing process, wherein a first page table structure comprises mapping data for the first and second executable code and wherein the second executable code comprises driver code of a device; updating the second page table structure to disable execution of the first executable code and to map a portion of the user space memory to the device; and restricting the first executable code from accessing the memory mapped device.

17 Claims, 7 Drawing Sheets

(56) References Cited

U.S. PATENT DOCUMENTS

| | | |
|---|---|---|
| 2017/0220466 A1 | 8/2017 | Gupta et al. |
| 2017/0315926 A1* | 11/2017 | Lemay ................ G06F 12/1027 |
| 2017/0329618 A1* | 11/2017 | Tsirkin ..................... G06F 8/65 |
| 2018/0032447 A1* | 2/2018 | Kaplan ............... G06F 9/45558 |
| 2018/0060574 A1 | 3/2018 | White et al. |
| 2018/0074969 A1* | 3/2018 | Neiger ................. G06F 12/145 |
| 2018/0150311 A1* | 5/2018 | Tsirkin ............... G06F 9/45558 |
| 2018/0165133 A1* | 6/2018 | Iyigun ................ G06F 12/1036 |
| 2018/0247082 A1* | 8/2018 | Durham ................. G06F 21/57 |
| 2018/0365163 A1* | 12/2018 | Das .................... G06F 12/1027 |
| 2018/0373556 A1* | 12/2018 | Tian ................... G06F 9/45558 |
| 2018/0373647 A1* | 12/2018 | Dewan ................... G06F 12/10 |
| 2018/0373895 A9* | 12/2018 | Durham ................. G06F 21/53 |
| 2019/0026136 A1* | 1/2019 | Nair ..................... G06F 3/0689 |

\* cited by examiner

EFFICIENT USERSPACE DRIVER ISOLATION BY SHALLOW VIRTUAL MACHINES

TECHNICAL FIELD

The present disclosure is generally related to memory protection in a computing device, and more particularly, to using a "shallow virtual machine" to enhance memory protection between different portions of user space memory of a computing process.

BACKGROUND

Computer systems often include memory management features that provide memory protection. The memory management features may restrict processes from accessing particular portions of memory. The restriction may be enforced using a combination of hardware features and kernel features that work together to enable or restrict an executing process from accessing memory resources. The memory resources are often separated into user space and kernel space and when a user space process attempts to access memory resources in kernel space the memory management features may generate a segmentation fault. The segmentation fault may indicate that an access violation occurred so that it can be handled accordingly. Device drivers typically execute in kernel space and rely on the memory management features to protect memory associated with the device driver from being accessed by user space processes.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Figure 1:
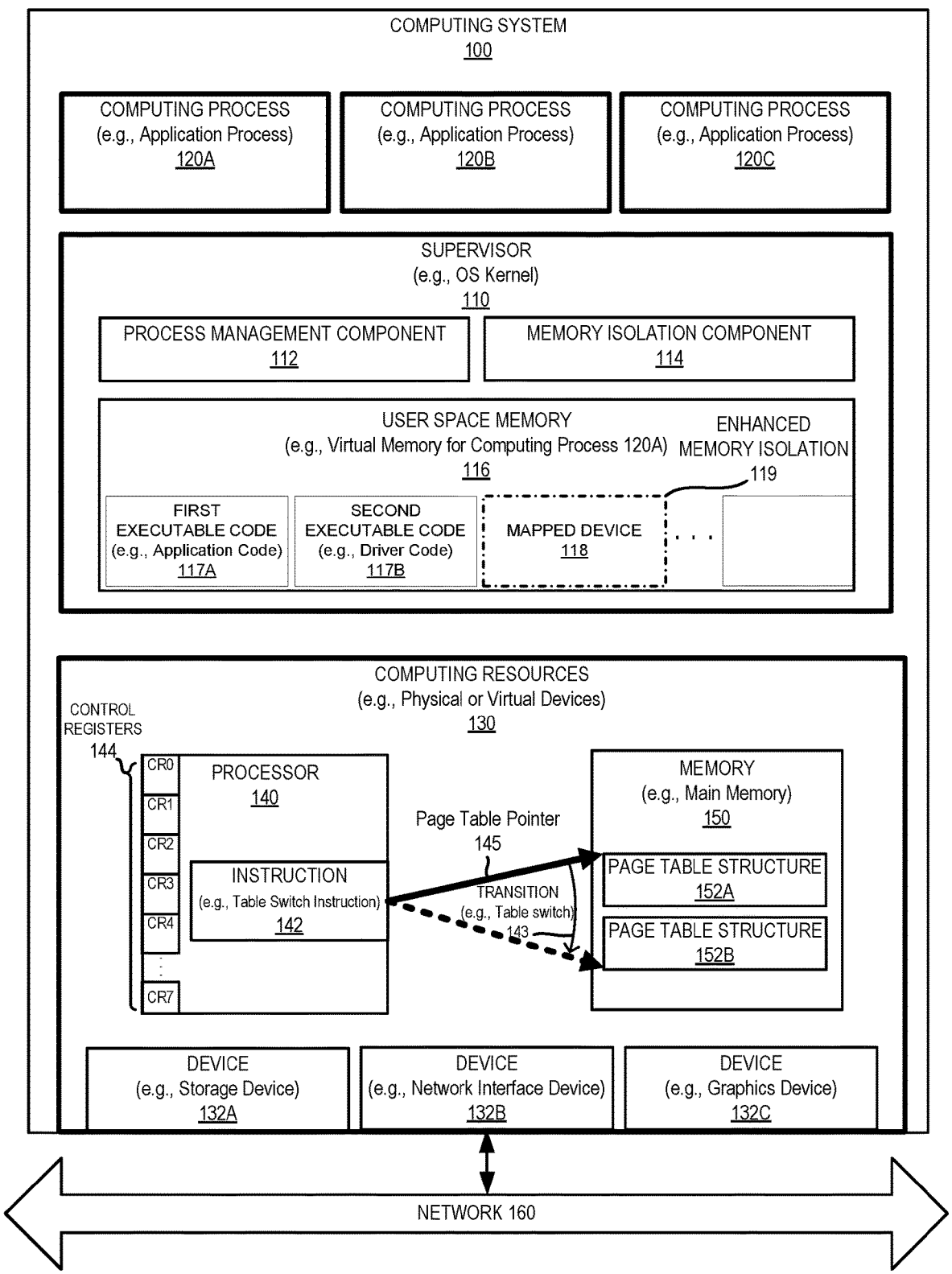
FIG. 1 depicts a high-level block diagram of an example computing system that provides memory protection between different portions of the user space memory assigned to a single computing process, in accordance with one or more aspects of the present disclosure.

Modern computer systems have begun implementing device drivers in user space to enhance performance. The enhancement to performance often adversely affects the memory protection features of the computer system. In one example, driver code of the device driver may be loaded into user space memory so that a process can execute the driver code while in user mode without performing a context switch to a more privileged mode. Therefore, the user mode process can interact with a device that is mapped in user space memory and avoid the overhead of context switches that occur when executing a system call or hypervisor call. User space drivers may enable application code to circumvent driver code and access the device directly. The access may be malicious or inadvertent and may be due to defective code (e.g., bugs), malicious code, other code, or a combination thereof. Enabling a process to circumvent the driver code to access the device may result in the memory of the device being improperly accessed and may result in the device being corrupted, compromised, inoperable, or a combination thereof.

Aspects of the present disclosure address the above and other deficiencies by providing technology that creates a "shallow virtual machine" (sVM) to enhance memory protection between different portions of user space memory of a computing process. The technology may involve configuring a computing system to execute a computing process in a "shallow virtual machine." The shallow virtual machine may be similar to a traditional virtual machine but may exist on a computing system that is absent a hypervisor. An operating system kernel may create the shallow virtual machine by activating a processor's hardware assisted virtualization features and configuring them in a manner that enables the shallow virtual machine to have direct access to the resources of the host device. Traditional virtual machines are isolated from some of the host resources and may instead access virtualized resources that are abstractions of the host resources and are controlled by the hypervisor. As a result, a traditional virtual machine accesses the virtual resource and the hypervisor translates the access to enable access to the corresponding host resources. In contrast, a shallow virtual machine may avoid or minimize the translation and enable a computing process in a shallow virtual machine to have access to the host resources directly, indirectly, or a combination thereof. For example, a shallow virtual machine may have access to host memory because the host page table may be configured to have a direct mapping between guest physical addresses and the host physical addresses. As a result, the shallow virtual machine may use actual physical addresses (i.e., guest physical addresses) that correspond directly to the host physical memory addresses without the need for any translation or with an identical mapping (e.g., 1 GB guest physical address directly maps to 1 GB host physical address). The shallow virtual machine may also or alternatively be configured to access other host resources (e.g., CPU registers, secondary storage). In this instance, the access may or may not cause a trap (e.g., VMExit) and the access request of the shallow virtual machine may proceed to any and all host resources, such as the host resources that a traditional hypervisor would have access to even though a traditional virtual machine may not have access to.

A shallow virtual machine may use multiple page table structures to control which portions of user space code have access to host resources (e.g., particular region of memory that is mapped to a device). The page table structures may be host page table structures that include mapping data that correlate guest physical addresses to host physical addresses. Each page table structure may include mapping data that identifies the same host physical addresses for the application code and the driver code but a first page table structure may be absent data providing access to the device and a second page table structure may include data to access the device (e.g., memory mapped to device). In addition, the first page table structure may indicate the application code is executable and the second page table structure may indicate the same application code is non-executable even though the application code for both page table structures are mapped to the same location within host physical memory.

The operating system kernel (e.g., supervisor) that configures the shallow virtual machine may also configure memory to include a first region and a second region. The second region may be referred to as an extra address range and may be inaccessible or have enhanced or reduced access depending on the page table structure that is active. In one example, the extra range of addresses may be outside of host physical memory and reserved for each host physical address. For example, the memory may be reserved using an address with a top bit set in CPU physical address range (e.g., based on CPU addressing capabilities). The page table structures discussed above may correspond to one of the regions and the first page table structure may correspond to the first region and the second page table structure may correspond to the second region. Each of the regions may map to the same application code and driver code in host physical memory but may include different permission data. In one example, the first region and second region (e.g., extra range) may be portions of guest physical memory and when the second page table structure is active the shallow virtual machine may have non-executable access to code in the first region (e.g., range below 1 GB) and may have executable access to code in the second region (e.g., range above 1 GB) this is discussed in more detail in regards to FIGS. 3A and 3B.

During execution of a user space process within the shallow virtual machine, the user space process may call an instruction to cause a processor to switch from the first page table structure to the second page table structure to enable the driver code to access the device and to restrict application code from executing. While executing the driver code, the user space process may call the instruction again to switch the active page table structure back to the first page table structure to enable the application code to continue executing.

In one example, the technology involves a processor that supports hardware assisted virtualization and provides an instruction that enables a user space computing process to switch between multiple page table structures. The computing process may be associated with a virtual machine data structure that makes the computing process appear to be a virtual machine from the perspective of the processor but the computing system may be absent a hypervisor and may not leverage other aspects of processor that occur when implementing a virtualized system (e.g., hypervisor managing virtual machines). The technology may be referred to as using a "shallow virtual machine" and may involve a processor receiving a request to create the computing process. The computing process may be assigned a portion of user space memory that is loaded with application code and loaded with driver code for accessing a particular device. The device may be a physical or virtual device and may be the same or similar to a network interface device, storage device, graphics device, or other device. The computing process may execute the instruction (e.g., processor instruction) to cause the processor to switch from using a first page table structure to a second page table structure. The first page table structure may include the mapping data for the application code and for the driver code of the device. The processor may also update the second page table structure to disable execution of the application code and to enable the shallow virtual machine to access the device via a portion of the user space memory mapped to the device. This may enhance the memory isolation and restrict the ability of the application code to circumvent the driver code to access the device.

The systems and methods described herein include technical improvements to memory management features of a computer system. In particular, aspects of the present disclosure may be particularly advantageous for a computer system that is using a user space device driver. The technical improvements enhance the memory protection and provide increased security, stability, and maintenance of a computing device. The security may be enhanced because the technology may enable memory isolation between different portions of a process's user space memory via the use of a shallow virtual machine. For example, insecure application code that is loaded in user space memory may now have restricted access to a device even though the device memory is mapped into a common portion of user space memory. This may enhance device stability because the memory protection may reduce direct access of application code to a device and therefore enforce application code to use driver code to access the device (e.g., use a certified device driver). This may also enhance maintenance because the isolation may make it easier to separate and debug application defects and device driver defects since errors encountered by the device are unlikely to be caused by application code that has been isolated.

Various aspects of the above referenced methods and systems are described in details herein below by way of examples, rather than by way of limitation. The examples provided below discuss the method above applied to restrict application code from directly modifying a memory mapped device. In other examples, the method and system discussed herein may be applied generally to restrict executable code of a computing processes from accessing a particular portion of the user space memory of the computing process.

FIG. 1 depicts an illustrative architecture of elements of a computing system 100, in accordance with an embodiment of the present disclosure. Computing system 100 may be a single host machine or multiple host machines arranged in a heterogeneous or homogenous group (e.g., cluster) and may include one or more rack mounted servers, workstations, desktop computers, notebook computers, tablet computers, mobile phones, palm-sized computing devices, personal digital assistants (PDAs), etc. It should be noted that other architectures for computing system 100 are possible, and that the implementation of a computing system utilizing embodiments of the disclosure are not necessarily limited to the specific architecture depicted. In one example, computing system 100 may be a computing device implemented with x86 hardware. In another example, computing system 100 may be a computing device implemented with PowerPC®, SPARC®, or other hardware. In the example shown in FIG. 1, computing system 100 may include a supervisor 110, computing processes 120A-C, computing resources 130, and a network 160.

Supervisor 110 may manage the execution of one or more computing processes and provide the computing processes with access to one or more underlying computing devices (e.g., hardware or virtualized resources). Supervisor 110 may be the same or similar to a kernel and may be a part of an operating system, separate from an operating system, or a combination thereof. Supervisor 110 may interact with computing resources 130 and provide hardware virtualization, operating-system virtualization, other virtualization, or a combination thereof. Hardware virtualization may involve the creation of one or more virtual machines or shallow virtual machines that abstract or emulate resources of a physical host computing machine. Operating-system-level virtualization may involve the creation of one or more containers that emulate an instance of an operating system. In one example, supervisor 110 may be part of a non-virtualized operating system that is absent hardware virtualization and operating-system-level virtualization and each of the computing processes 120A-C may be an application process managed by the non-virtualized operating system.

In the example, shown in FIG. 1, supervisor 110 may include process management component 112 and memory isolation component 114. Process management component 112 may enable supervisor 110 to create and configure computing processes 120A-C. Memory isolation component 114 may enable supervisor 110 to provide memory isolation between different portions of a computing process's user space memory by using multiple page table structures. Process management component 112 and memory isolation component 114 are discussed in more detail in regards to FIG. 2A and may be used individually or in combination to provide enhanced memory management features for computing processes 120A-C.

Computing processes 120A-C may include a sequence of instructions that can be executed by one or more processing devices (e.g., processor 140). A computing process may be managed by supervisor 110 or may be a part of supervisor 110. For example, supervisor 110 may execute as one or more computing processes that cooperate to manage resource accessed by computing processes 120A-C. Each computing process may include one or more threads, processes, other stream of executable instructions, or a combination thereof. A thread may any computer based "thread of execution" and may be the smallest sequence of programmed instructions managed by supervisor 110. A process may include one or more threads and may be an instance of an executable computer program.

Computing processes 120A-C may be associated with a particular level of privilege that may be the same or similar to protection levels (e.g., processor protection rings). The privilege level may indicate an access level of a computing process to computing devices (e.g., memory, processor, or other virtual or physical resources). There may be multiple different privilege levels assigned to the computing processes 120A-C. In one example, the privilege levels may correspond generally to a user mode (e.g., reduced privilege mode, non-root mode, non-privileged mode) and a supervisor mode (e.g., enhanced privilege mode, kernel mode, root mode). The computing process executing in user mode may access resources assigned to the computing processes and may be restricted from accessing resources associated with kernel space or with another user mode process (e.g., other portion of user space). The supervisor mode may enable the computing process to access resources associated with the kernel space and the user space. In other examples, there may be a plurality of privilege levels, and the privilege levels may include a first level (e.g., ring 0) associated with a supervisor/kernel, a second and third level (e.g., ring 1-2), and a fourth level (e.g., ring 3) that may be associated with user space applications.

A computing process may be referred to as a user space process when the computing process is executing with a user mode privilege level. The term user space process and user mode process may be used interchangeably herein. In one example, the privilege level associated with a computing process may change during execution and a computing process executing in user space (e.g., userland) may request and be subsequently granted enhanced privileges by supervisor 110. Modifying the privilege level is often associated with a context switch (e.g., system call or hypercall) and may be associated with a substantial performance penalty. Therefore, it is advantageous if a user space process can avoid a modification of its privilege level and can perform tasks by accessing user space memory 116.

User space memory 116 may be a portion of virtual memory that is assigned to a particular computing process (e.g., 120A). The virtual memory may be managed by supervisor 110 and may be segregated into kernel space (not shown) and user space. The user space may be referred to as userland and may be further segregated into individual portions that are assigned to respective computing processes 120A-C. To simplify the illustration, the portions of the user space assigned to computing process 120A is illustrated (e.g., user space memory 116) and the portions of user space assigned to computing processes 120B and 120C are not shown. During execution of computing process 120A, the user space memory 116 may be updated to add or remove executable data and non-executable data.

The executable data may be referred to as executable code and may include binary code, machine code, object code, bytecode, other code, or a combination thereof. The executable code may be a collection of one or more instructions, function calls, commands, operations, or a combination thereof. The executable code may be loaded into user space memory 116 from one or more storage objects in secondary storage (e.g., hard drive, solid state drive). The storage objects may include one or more file objects (e.g., files, directories), database objects (e.g., records), other storage objects, or a combination. In one example, the storage objects may include one or more executables (EXE), libraries (e.g., dynamically linked library (DLL), shared object library (SO)), other executable objects, or a combination thereof. As shown in FIG. 1, the executable data in user space memory 116 may include first executable code 117A and second executable code 117B.

First executable code 117A and second executable code 117B may correspond to executable data from different computer programs that may or may not interact with one another. The computer programs may be designed, developed, and distributed by different entities or by the same entity. First executable code 117A may depend on functionality provided by the second executable code 117B or may be independent from functionality provided by the second executable code 117B. First executable code 117A may be dependent on second executable code 117B if it invokes features implemented by second executable code 117B. In one example, first executable code 117A may be uncertified application code and the second executable code may be certified driver code. The certification may be based on policies of the provider of the supervisor (e.g., kernel development entity), the provider of the device (e.g., device development entity), a third party source, or a combination thereof. The application code may link directly or indirectly to the second executable code 117B and make calls to the driver code to cause a device to perform computing tasks.

First executable code 117A may be any computer program and may include application code. The term application code may be used synonymously with program code and need not provide a user interface or interact directly or indirectly with a user. Some examples of first executable code 117A may include one or more computer programs implementing network function virtualization (NFV). Network function virtualization may be a virtual network architecture that virtualizes networking features that are provided by traditional physical network nodes. Network function virtualization may provide virtual switches, routers, firewalls, network accelerators, intrusion detection devices, load balancers, other networking device, or a combination thereof.

Second executable code 117B may be any computer program that is associated with one or more devices 132 (e.g., network interface device 132B). Second executable code 117B may include executable code of a device driver that operates or controls a particular type of device and may be referred to as driver code. The driver code may enable computing processes 120A-C (e.g., applications) or supervisor 110 (e.g., kernel) to access functions of a device without being aware of the underlying details of the device. The device driver may communicate with the device through a computer bus or communication subsystem.

Second executable code 117B may provide features (e.g., routines, functions, methods) that can be invoked by first executable code 117A or supervisor 110. In response to being invoked, second executable code 117B may issue commands to the corresponding device. When the device sends data back to the device driver, the device driver may invoke routines in the original invoking program. Device drivers may be dependent on the supervisor type (e.g., operating-system type), processor type (e.g., hardware architecture), or a combination thereof. In one example, second executable code 117B may be used to implement a user space device driver.

A user space device driver is a device driver that can be executed by a computing process that is running at a user mode privilege level (e.g., a user space process). The driver code for the user space device driver may be loaded into user space memory of the same computing process that is invoking the driver code or into the user space memory of a different computing process. As used herein, the term user space device driver may be used interchangeably with user mode device driver. In one example, the user space device driver may be based on a data plane development kit (DPDK). The data plane development kit may be a framework that includes a set of network interface controller drivers and data plane libraries that support fast packet processing for high speed data packet networking applications. In another example, the user space device driver may be based on a storage performance development kit (SPDK). The storage performance development kit may be a framework that includes a set of storage controller drivers and libraries that support high performance storage applications. SPDK may enable storage drivers to execute in userspace to avoid system calls (e.g., syscalls), hypervisor calls (e.g., hypercalls), or a combination thereof. SPDK may enable zero-copy access from application code. SPDK may also or alternatively enable polling hardware for completions instead of relying on interrupts and avoid (e.g., reduce or eliminate) locks in the I/O path instead relying on message passing.

The user space device driver may communicate with a device by accessing and modifying the mapped device 132 portion of user space memory 116. Mapped device 132 may be mapped to a particular device and be used to implement memory mapped input/output (I/O). Mapped device 132 may be any region of virtual memory that when accessed or modified transmits data to or from the particular device as opposed to or from main memory. In one example, the portion of user space memory for mapped device 132 may correspond to mapped data storage of the particular device (e.g., register, memory, buffer, queue on the device). Therefore, when computing process 120A stores data to mapped device 132 it may be stored in data storage of the device. In another example, the portion of user space memory for mapped device 132 may correspond to a communication channel (e.g., data bus, port, or other interface) that transmits data to the device (e.g., to a processor of the device). In either example, mapped device 132 may enable computing process 120A to communicate with one or more of the devices 132A-C.

Devices 132A-C may be any computing device that can receive a request and perform a computing task. The computing task may involve transmitting data (e.g., output data), receiving data (e.g., input data), or a combination thereof. Devices 132A-C may include physical devices, virtual devices, or a combination thereof. As shown in FIG. 1, device 132A may be a storage device, device 132B may be a network interface device, and device 132C may be a graphics device. The storage device may include a storage controller associated with one or more mass storage devices that include solid-state storage (e.g., Solid State Drives (SSD)), hard drives, other persistent data storage, or a combination thereof. The network interface device may provide access to a network internal to computing system 100 or external to computing system 100 (e.g., network 160) and in one example may be a network interface controller (NIC). The graphics device may provide graphics processing for computing system 100. One or more of devices 132A-C may be combined into one or more physical devices (e.g., integrated devices) or may partially or completely emulated by a combination of computing resources 130. Computing resources 130 may refer to the physical devices, virtual devices, of computing system 100 and may include a processor 140 and memory 150.

Processor 140 may refer to one or more processing devices or processing units that are capable of executing instructions that encode arithmetic, logical, or I/O operations. Processor 140 may be a single core computer processor capable of executing one instruction at a time (e.g., single pipeline of instructions) or may be a multi-core computer processor that simultaneously executes multiple instructions concurrently. A processor may be implemented as a single integrated circuit, two or more integrated circuits, or may be a component of a multi-chip module (e.g., in which individual microprocessor dies are included in a single integrated circuit package and hence share a single socket). Processor 140 may include features of a central processing unit (CPU), graphical processing unit (GPU), a microcontroller, other computer processor, or a combination thereof. Processor 140 may implement an instruction set architecture (ISA) that functions as an interface between processor 140 and the computing processes being executed by processor 140 (e.g., computing processes 120A-C). The instruction set architecture may be the same or similar to x86 (e.g., Intel®, AMD®), PowerPC®, Advanced RISC Machine (ARM®), Scalable Processor Architecture (SPARC®), other computer architecture, or a combination thereof. The instruction set architecture may include an instruction 142.

Instruction 142 may cause the processor to switch the active page table structure. The instruction 142 may be referred to as a processor instruction or a hardware instruction and may cause transition 143 (e.g., page table switch). Instruction 142 may be exposed to code executing at a user mode privilege level (e.g., non-root), a kernel privilege level (e.g., root), other privilege level, or a combination. As a result, instruction 142 may be invoked (e.g., called) by computing processes 120A-C, supervisor 110, or a combination thereof. In one example, instruction 142 may switch the active page table structure (e.g., current page table structure) between multiple page table structures by updating processor configuration data in one or more control registers 144.

Control registers 144 may be hardware registers that control the behavior of processor 140. Control registers 144 may include internal registers that are on the processor (e.g., processor registers), external register that are external to the processor (e.g., hardware registers), or a combination thereof. Control registers 144 may be set or updated to control processor behavior that is related to interrupts, addressing modes, paging control, other processor functions, or a combination thereof. One or more of the control registers 144 may indicate that processor 140 is associated with a page table pointer 145. Page table pointer 145 may include identification data (e.g., physical memory address) of page table structure 152A or 152B.

Page table structures 152A and 152B may be data structures that store mapping data that maps locations between address spaces, such as between an address space of a virtual machine (e.g., shallow virtual machine) and an address space of a host machine. In one example, processor 140 and supervisor 110 may use the page table structure to resolve an address in guest physical memory to an address in host physical memory. In one example, page table structures 152A-B may be the same or similar to Extended Page Tables (EPT) by Intel®, Rapid Virtualization Indexing (RVI) by AMD®, other hardware-assisted virtualization structure, or a combination thereof.

Memory 150 may include any persistent or non-persistent data storage that is capable of storing digital data. Memory 150 may function as main memory for computing system 100 and may include one or more physical memory devices. The physical memory device may be the same or similar to volatile memory devices (e.g., RAM), non-volatile memory devices (e.g., NVRAM), other types of memory devices, or a combination thereof.

Network 160 may be a public network (e.g., the internet), a private network (e.g., a local area network (LAN), wide area network (WAN)), or a combination thereof. In one example, network 160 may include a wired or a wireless infrastructure, which may be provided by one or more wireless communications systems, such as a wireless fidelity (WiFi) hotspot connected with the network 160 and/or a wireless carrier system that can be implemented using various data processing equipment, communication towers, etc.

Figure 2:
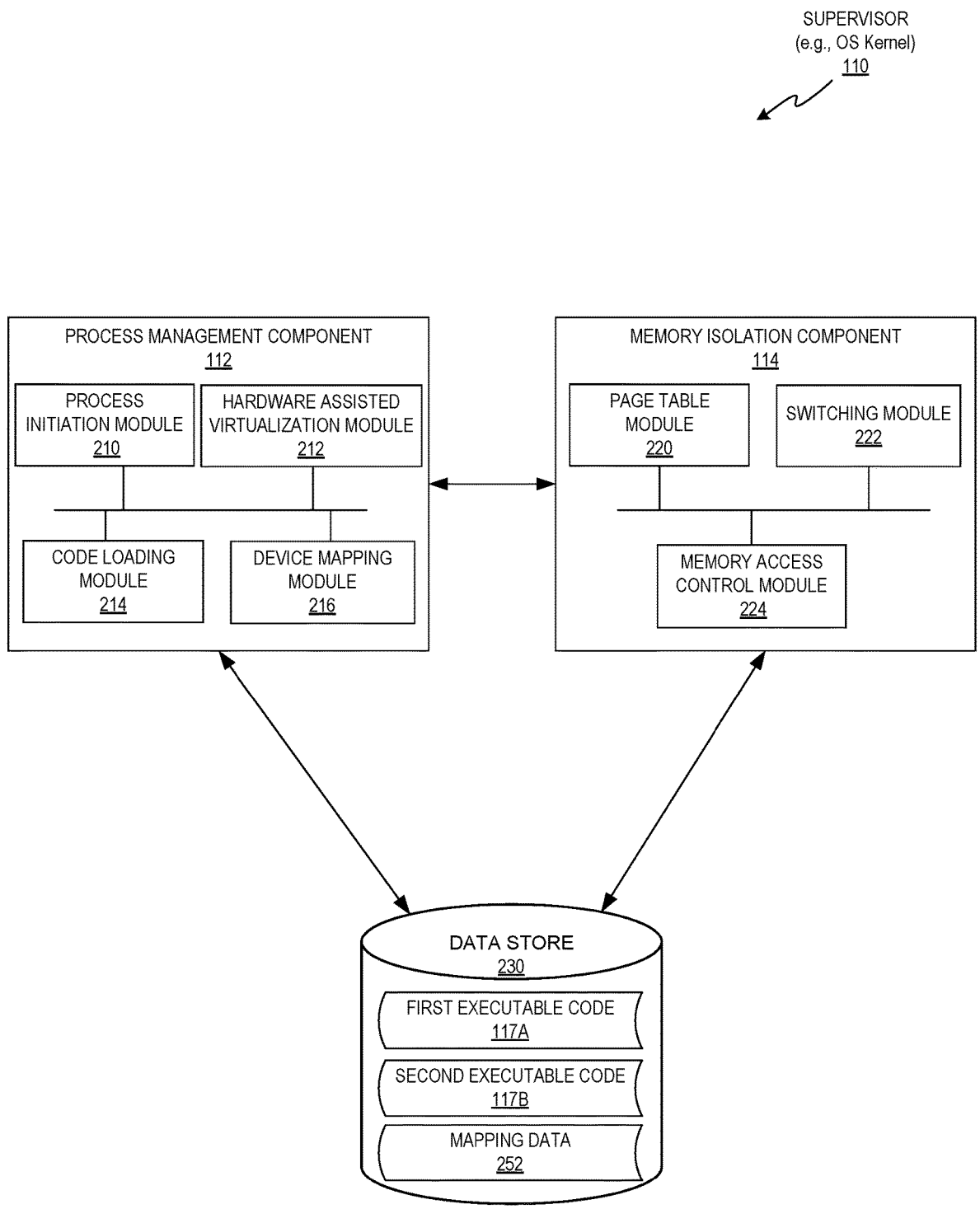
FIG. 2 depicts a block diagram illustrating components and modules of an example supervisor, in accordance with one or more aspects of the present disclosure.

FIG. 2 depicts a block diagram illustrating an exemplary supervisor 110 that includes technology for providing memory isolation between portions of user space memory assigned to a computing process, in accordance with one or more aspects of the present disclosure. Supervisor 110 may be the same or similar to supervisor 110 of FIG. 1 and may include a process management component 112, a memory isolation component 114, and a data store 230. The components and modules discussed herein may be performed by any portion of supervisor 110 (e.g., OS kernel) or by an application, virtual machine, other portion of a computing system, or a combination thereof. More or less components or modules may be included without loss of generality. For example, two or more of the components may be combined into a single component, or features of a component may be divided into two or more components. In one implementation, one or more of the components may reside on different computing devices (e.g., a client device and a server device).

Process management component 112 may enable supervisor 110 to manage the execution of one or more computing processes. In one example, process management component 112 may include a process initiation module 210, a hardware assisted virtualization module 212, a code loading module 214, and a device mapping module 216.

Process initiation module 210 may receive and fulfill a request to create a new computing process. In response to the request, process initiation module 210 may initiate, generate, launch, other operation, or a combination thereof to enable the new computing process to be executed by a processor. The request may be based on user input (e.g., user launching an executable) or input from an existing computing process (e.g., spawn, fork or other operation). During process creation, process initiation module 210 may allocate a user space portion of virtual memory and assign it to the new computing process.

Hardware assisted virtualization module 212 may enable supervisor 110 to configure the processor to support hardware assisted virtualization features and may associate the features with the new computing process. Hardware assisted virtualization features may include special instructions that facilitate hardware level virtualization (e.g., virtual machine execution and management). The special instructions may include internal processor operations and externally available processor instructions. The processor instructions may be invoked by a computing process executing in a privileged mode (e.g., ring 0) or reduced privilege mode (e.g., ring 1+). Hardware assisted virtualization module 212 may configure the processor and or computing process by creating or modifying data or data structures in one or more storage locations (e.g., processor registers or memory blocks). The hardware assisted virtualization features may be activated at the processor level and affect some or all of the computing processes executed by the processor or may be activated at the process level and apply to one or more specific computing processes. In either example, the computing processes may be associated with a virtual machine data structure that controls the hardware assisted virtualization features.

The virtual machine data structure may be a data structure that is stored in memory and controls the execution of a particular virtual machine. A single processor may be associated with multiple virtual machine data structures and each virtual machine data structure may correspond to one or more virtual machines. A virtual machine data structure may include a field that corresponds to a page table pointer. Hardware assisted virtualization module 212 may enable supervisor 110 to associate the virtual machine data structure with the new computing process. This may cause the processor to interpret the new computing process as a virtual machine even though the computing system executing the supervisor (e.g., host machine) may be absent a hypervisor. In one example, the virtual machine data structure may be the same or similar to a Virtual Machine Control Structure (VMCS) that is used by an x86 processor.

Associating a computing process with a virtual machine data structure in the absence of hypervisor features (e.g., hypervisor or Virtual Machine Monitor (VMM)) may be referred to as providing a "shallow virtual machine." The virtual machine control structure may be configured to implement the shallow virtual machine by passing all accesses to the processor and avoiding an exit to a hypervisor (e.g., VMExit) and/or a memory translation between the VM address space (e.g., guest physical address space) and the host address space (e.g., host physical address space). Memory address translations may be avoided or minimized because the guest physical address space may be identically mapped (e.g., one-to-one) with the host physical address space and a guest physical address may be identical to its corresponding host physical address.

Code loading module 214 may enable supervisor 110 to load executable code for the new computing process. Code loading module 214 may load the executable code from secondary storage into physical memory and may associate the executable code with a location (e.g., one or more pages) within user space memory of the computing process. Code loading module 214 may load first executable code 117A and second executable code 117B into multiple different regions of a guest physical address space. For example, code loading module 214 may load application code and driver code into a first region of guest physical memory and into a second region of guest physical memory. The application code and driver code in each respective region may point to the same identical portions of host physical memory so that the host physical memory includes a single copy that is pointed to by the two different regions. This may be advantageous because the regions may correspond to different permissions (e.g., different mapping data) and the page table structures may be configured to make some or all of the first or second region executable or non-executable to alter the execution of code stored in that region, as discussed in more detail in regards to FIGS. 3A and 3B.

Code loading module 214 may load first executable code 117A and second executable code 117B at the same time or at different times. In one example, first executable code 117A and second executable code 117B may be loaded during an initiation of the new computing process. In another example, first executable code 117A may be loaded when the new computing process is initiated and the second executable code 117B may be loaded after the first executable code 117A begins executing, which may be before, during, or after the first executable code makes a call to second executable code 117B. In either example, first executable code 117A may include application code and second executable code 117B may include driver code. Both the application code and driver code may be loaded into the same userspace memory of the computing process but may be loaded into different regions of the guest physical memory. For example, application code may be loaded into a first region of guest physical memory (e.g., <1 GB) and driver code may be loaded into a second region of guest phsycial memory (e.g., extra address range >1 GB). The computing process may then execute the first and second executable code to interact with a device via device mapping module 216.

Device mapping module 216 may enable supervisor 110 to configure a portion of the user space memory of the new computing process to access a device (e.g., network controller). In one example, configuring the portion of user space memory may involve mapping virtual memory pages to storage of the device (e.g., register, memory, buffer, queue on the device). In another example, configuring the portion of user space memory may involve mapping virtual memory pages to a communication channel with access to the device. The communication channel may be a local computer bus for attached hardware devices and may be the same or similar to a Peripheral Component Interconnect (PCI) bus. In either example, data accessed via the mapped device (e.g., read from or written to) may involve communication with the device as opposed to main memory.

Memory isolation component 114 may enable supervisor 110 to manage access to the portion of user space memory mapped to a device. Memory isolation component 114 may enable or restrict executable code stored within the user space memory from accessing the portion of the user space memory mapped to the device. In one example, memory isolation component 114 may include a page table module 220, a switching module 222, and a memory access control module 224.

Page table module 220 may enable supervisor 110 to configure multiple page table structures. The page table module 220 may generate the page table structures or update existing page table structures. Updating the page tables may involve adding, removing, or replacing mapping data 252. Mapping data 252 may include permission data, location data, other data or a combination thereof. The permission data may indicate the permissions associated with particular locations in memory and whether the data at the locations is executable, non-executable, privileged, non-privileged, or a combination thereof. The location data may identify one or more locations in the virtual machine memory (e.g., guest physical memory addresses) and one or more locations in host memory (e.g., host physical memory addresses). In one example, the location data of a particular page table structure may include identical (e.g., one-to-one) mapping between a location in memory of the virtual machine and a location in physical memory of the host. In another example, the location data may include many-to-one mapping and multiple locations in memory of the virtual machine may map to the same location in memory of the host.

Page table module 220 may create multiple page table structures that are associated with the same computing process during the execution of the computing process. A first page table structure may be configured to include mapping data for the first executable code and the second executable code but may be absent a mapping to access the device. A second page table structure may include mapping data for the first and second executable code and mapping data to access the device. The second page table may also be configured so that the mapping data indicates the first executable code (e.g., application code) is non-executable.

Switching module 222 may enable a computing process managed by supervisor 110 to invoke an instruction to switch the page table structures used to resolve the computing processes user space virtual memory to physical memory. The instruction may cause the processor to switch the active page table structure from the first page table structure to the second page table structure. The instruction may cause an update to the virtual machine data structure and to one or more control registers. The switch instruction may be a processor instruction that enables the computing process executing in user mode to cause the processor to switch from the first page table structure to the second page table structure.

In one example, the switching instruction may be specific to an Intel® x86 architecture. The x86 architecture may provide hardware assisted virtualization features, which may be referred to as virtual machine Extensions® (VMX). The virtual machine extensions may be activated and controlled using a virtual machine data structure that is referred to as a Virtual Machine Control Structure (VMCS). The instruction may be a specific virtual machine (VM) function (VMFUNC(0)) that switches a page table pointer (e.g., Extended Page Table Pointer (EPTP)) from the first page table structure to the second page table structure (e.g., second extended page table). The VM function may be a privileged processor operation that can be invoked by a virtual machine without performing a VM exit and may therefore avoid one or more context switches associated with the VM exit. VM functions may be enabled and configured by the settings of certain fields in the virtual machine data structure. The computing process may invoke the VM function by using a special ISA-dependent instruction (e.g., VMFUNC) in combination with a certain processor register (e.g., EAX) to select the specific aspect of the VM function to be invoked. Even though the VM function code does not run with elevated privileges, it may be granted access to some privileged resources, e.g., the kernel memory or memory of other computing processes.

Memory access control module 224 may enable supervisor 110 to use the features discussed above to restrict or enable access to a device from different portions of executable code. Both the first executable code 117A and second executable code may be executed by the same computing process and stored in the user space memory of the computing process. But memory access control module 224 may restrict the first executable code (e.g., application code) from accessing the portion of user space memory mapped to the device and enable the second executable code (e.g., driver code) to access the portion of user space memory mapped to the device.

The computing system may be configured to restrict the first executable code from accessing the device independent of which page table structure is in use. When the first page table structure is in use, the portion of user space mapped to the device may not provide the shallow virtual machine with access to the device (e.g., underlying guest physical memory may not be mapped to device in active host page table). In one example, the portion of user space mapped to the device may be visible in user space but a lack of mapping data in the first page table may cause the processor to produce an exception when accessed by the first executable code (e.g., error, protection fault, segmentation fault). In another example, mapping information may make it appear to the first executable code that there is no portion of user space mapped to the device. Even if the first executable code switches to the second page table structure, the first executable code would still not be able to access the device because the second page table structure causes the first executable code to become non-executable. Therefore, the execution of the next instruction of the first executable code would cause a processor exception (e.g., non-executable exception or other error).

The second executable code may enable access the device by calling the switch instruction. The switch instruction may cause the processor to switch from the first page table structure to the second page table structure, which includes mapping data for the device. After the switch, the second executable code may access the portion of user space memory that is mapped to the device and when complete the second executable code may call the same instruction with the same or different parameters to switch back to the first page table structure. Switching back may then enable the first executable code to continue executing.

Figure 3A:
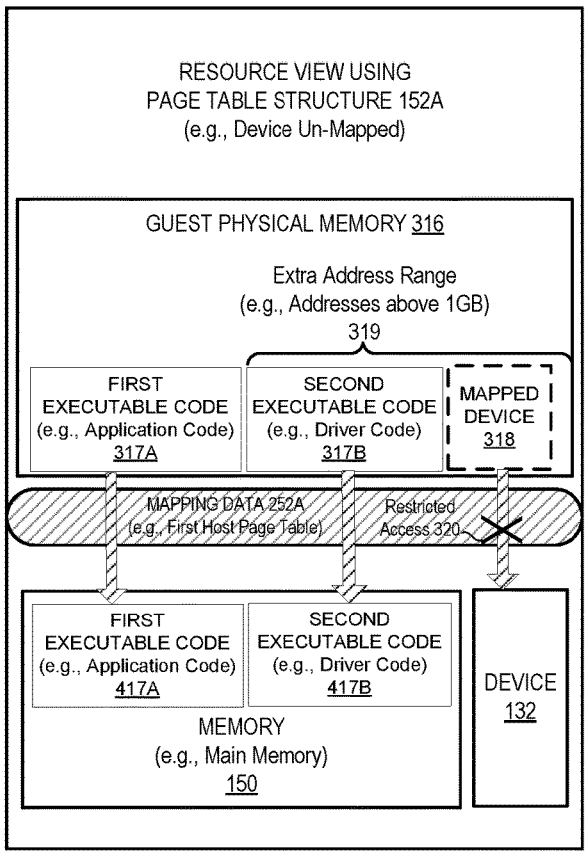
FIG. 3A depicts a block diagram illustrating a shallow virtual machine's access to host resources using a first page table structure, in accordance with one or more aspects of the present disclosure.
Figure 3B:
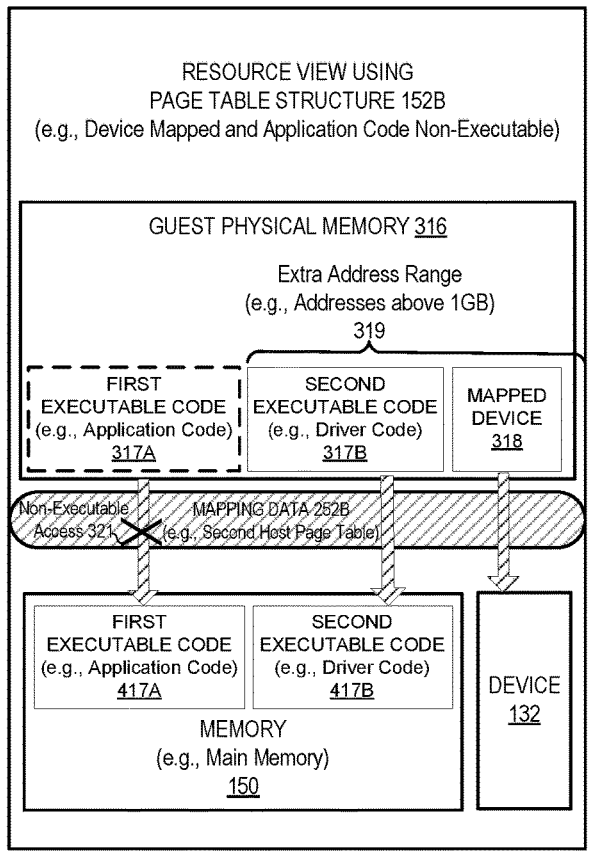
FIG. 3B depicts a block diagram illustrating a shallow virtual machine's access to host resources using a second page table structure, in accordance with one or more aspects of the present disclosure.

FIGS. 3A and 3B depict how the access to hardware resources change when the active page table structure is switched. FIG. 3A illustrates the shallow virtual machine's access to host computing resources when a first host page table is in use (e.g., mapping data 252A) and FIG. 3B illustrates the shallow virtual machine's access to host computing resources when a second host page table is in use (e.g., mapping data 252B). Each of FIGS. 3A and 3B may represent the memory abstractions and devices that underlay the user space memory 116 of FIG. 1. User space memory 116 (not shown) may be mapped to portions of guest physical memory 316 and guest physical memory 316 may be mapped to underlying computing resources using alternating host page tables. The first host page table of FIG. 3A may correspond to the first page table structure discussed above and the second host page table of FIG. 3B may correspond to the second page table structure discussed above.

Referring to FIG. 3A, the shallow virtual machine may have restricted access to device 132 when the first host page table is active, as shown by restricted access 320. Device 132 may be the same or similar to one of the devices 132A-C of FIG. 1 and the restricted access may occur because mapping data 252A of the first host page table may not map the "mapped device 318" portion of guest physical memory 316 to device 132. As such, even though the "mapped device 118" portion of user space memory 116 maps to guest physical memory 316 there may not be a mapping from the guest physical memory 316 to device 132. As a result, access by the shallow virtual machine to device 132 may be restricted when the first host page table is in use.

Referring to FIG. 3B, the shallow virtual machine may be provided access to device 132 when the second host page table is activated (e.g., mapping data 252B). This may occur when a supervisor (e.g., kernel) and/or processor causes the active host page table to be switched from the first host page table to the second host page table. The mapping data 252B of the second host page table may include a mapping from the "mapped device 318" portion of guest physical memory 316 to device 132 and therefor enable code executed by the shallow virtual machine to access device 132. The mapping data 252B may also be configured to enable code in extra address range 319 (e.g., driver code) to be executable and to make all other code (e.g., application code) non-executable, as shown by non-executable access 321. This may cause shallow virtual machine to have read access to first executable code 317A (e.g., application code) but may prohibit the shallow virtual machine from executing this code when the second host page table is active. A subsequent switch of the active page table from the second host page table to the first host page table may enable the first executable code 317A to continue executing. In one example, guest physical memory 316 may include a first region (e.g., regular addresses) and a second region (e.g., extra address range 319) and when the second host page table is activated the code in the first region may become non-executable and the code in the second host page table may remain executable. The first region may be any portion of guest physical memory that is below a particular address (e.g., 1 GB, 1 TB, or other address) and the second region may be any guest physical memory above the particular address (or vice versa).

Figure 4:
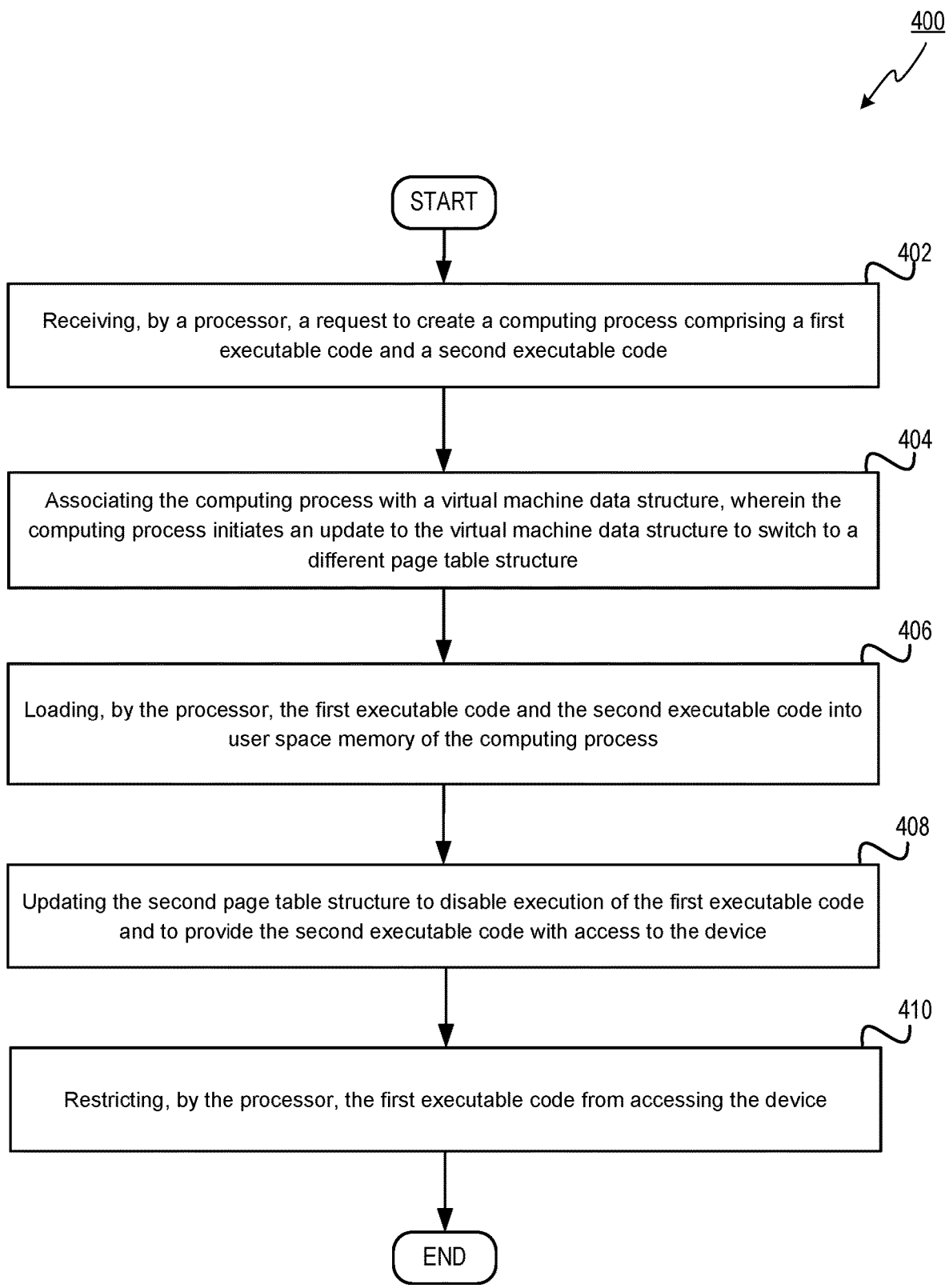
FIG. 4 depicts a flow diagram of an example method for enabling a processor to provide enhanced memory protection for memory resources, in accordance with one or more aspects of the present disclosure.

FIG. 4 depicts a flow diagram of an illustrative example of a method 400 for enabling a processor to provide enhanced memory protection for memory resources, in accordance with one or more aspects of the present disclosure. Method 400 and each of its individual functions, routines, subroutines, or operations may be performed by one or more processors of a computer device executing the method. In certain implementations, method 400 may be performed by a single processor. Alternatively, methods 400 may be performed by two or more processors executing on the computer system and each processor may execute one or more individual functions, routines, subroutines, or operations of the method. In an illustrative example, the processes implementing methods 400 may be synchronized (e.g., using critical sections, semaphores, and/or other thread synchronization mechanisms). Alternatively, the processes implementing method 400 may be executed asynchronously with respect to each other.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing systems (e.g., one or more computing devices). The term "article of manufacture," as used herein, is intended to encompass a computer program accessible from any computer-readable device or storage media. In one implementation, method 400 may be performed by processor 140 executing the supervisor 110 of FIGS. 1 and 2 and may begin at block 402.

At block 402, the processor may receive a request to create a computing process comprising a first executable code and a second executable code. Before, during, or after receiving the request the processor may activate a hardware assisted virtualization feature of the processor. The hardware assisted virtualization feature may include a processor instruction to update a page table pointer of the processor from a first page table structure to the second page table structure. In one example, the processor may include one or more Intel® x86 processors and the hardware assisted virtualization feature may be virtual machine extensions (VMX). The processor instruction may be a virtual machine function (VMFUNC) that switches an Extended Page Table Pointer (EPTP) of the Intel x86 processor from the first page table structure to the second page table structure.

At block 404, the processor may associate the computing process with a virtual machine data structure. This may cause the computing process to execute in a shallow virtual machine or by a shallow virtual machine on a host device that is absent a hypervisor. The shallow virtual machine may include guest physical memory that is mapped identically (e.g., one-to-one) to host physical memory of the host device and may therefore avoid or reduce address translations between guest physical memory and host physical memory. In one example, the virtual machine data structure may be a virtual machine control structure (VMCS) that is configured to pass accesses to the processor and avoid exiting to a hypervisor. The computing process may be capable of initiating an update to the virtual machine data structure to cause the processor to switch between the first page table structure and the second page table structure. The first page table structure and the second page table structure may each comprise a host page table structure comprising an identical mapping between a guest physical memory address and a host physical memory address.

At block 406, the processor may load the first executable code and the second executable code into user space memory of the computing process. The first page table structure may include mapping data for the first executable code and for the second executable code. The first executable code may be application code that includes a call to the second executable code, which includes driver code of a device (e.g., physical or virtual network device). The first page table structure may be absent mapping data to access the device and the second page table may include mapping data to access the device.

At block 408, the processor may update the second page table structure to disable execution of the first executable code and to provide the second executable code with access to the device. The first page table structure may include mapping data for the application code in a first region of guest physical memory and the second page table structure may include mapping data for the same application code in a second region of guest physical memory. The application code in the first region of physical memory may be executable and the application code in the second region of guest physical memory may be non-executable. The process may switch to the second page table structure to enable the second executable code to execute and access the device. In one example, the driver code in the user space memory (e.g., second executable code) invokes the instruction to switch to the second page table to gain access to the device and invokes the instruction again to switch to the first page table to restrict access to the device. In this example, the first executable code may be absent a call to the switch instruction and the second executable code may call it at least two or more times.

At block 410, the processor may restrict the first executable code from accessing the device. Restricting the first executable code from accessing the device may involve the processor generating an error in response to the first executable code attempting to run after the switch to the second page table structure. Responsive to completing the operations described herein above with references to block 410, the method may terminate.

Figure 5:
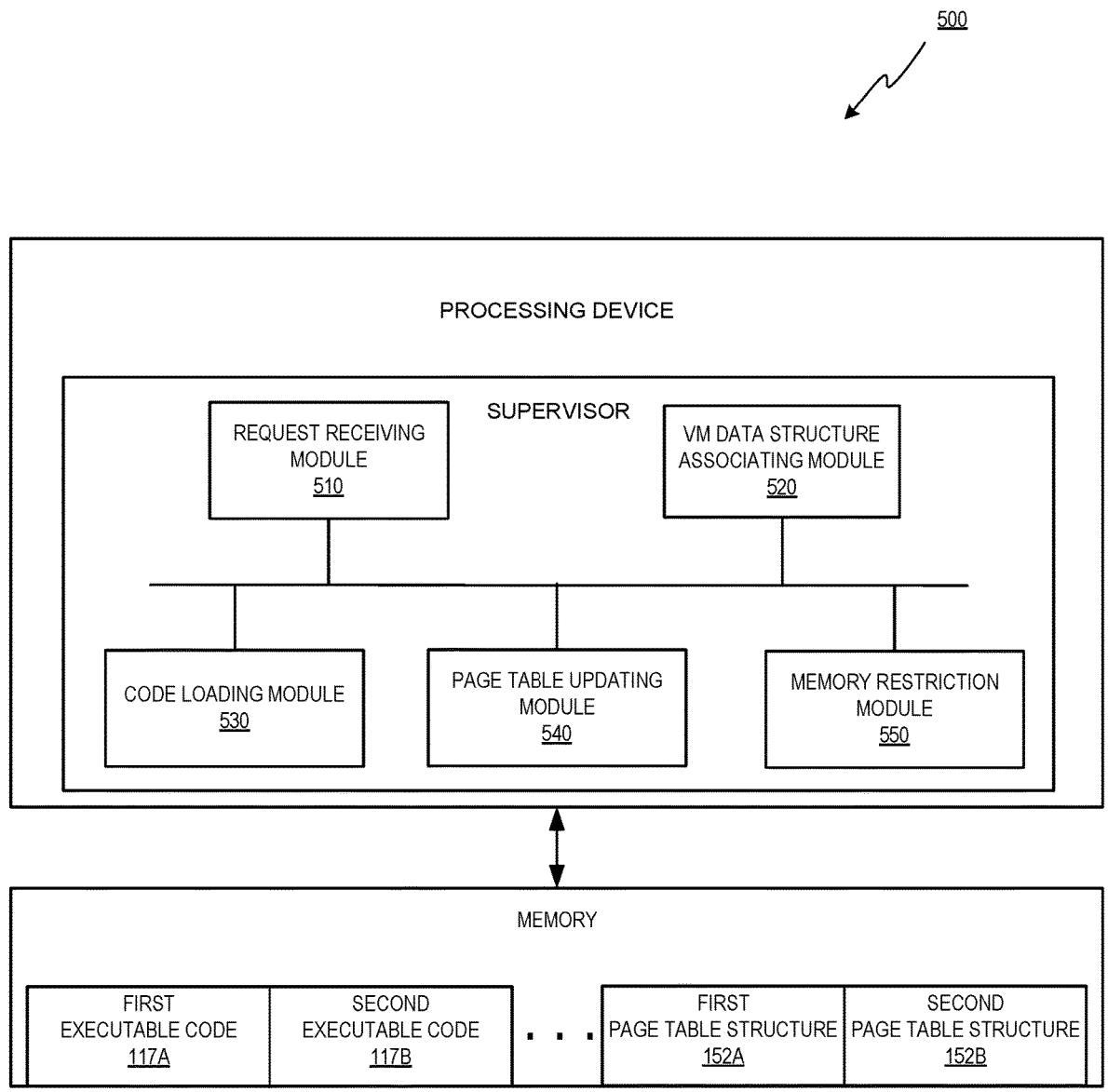
FIG. 5 depicts a block diagram of an example computer system in accordance with one or more aspects of the present disclosure.

FIG. 5 depicts a block diagram of a computer system 500 operating in accordance with one or more aspects of the present disclosure. Computer system 500 may be the same or similar to computing system 100 of FIG. 1 and may include one or more processing devices and one or more memory devices. In the example shown, computer system 500 may include a request receiving module 510, a VM data structure associating module 520, a code loading module 530, a page table updating module 540, and memory restriction module 550.

Request receiving module 510 may enable a processing device to receive a request to create a computing process comprising a first executable code and a second executable code. Before, during, or after receiving the request the processor may activate a hardware assisted virtualization feature of the processor. The hardware assisted virtualization feature may include a processor instruction to update a page table pointer of the processor from a first page table structure 152A to the second page table structure 152B. In one example, the processor may include one or more Intel® x86 processors and the hardware assisted virtualization feature may be virtual machine extensions (VMX). The processor instruction may be a virtual machine function (VMFUNC) that switches an Extended Page Table Pointer (EPTP) of the Intel x86 processor from the first page table structure to the second page table structure. This may cause the computing process to execute in a shallow virtual machine or as a shallow virtual machine on a host device that is absent a hypervisor. The shallow virtual machine may include guest physical memory that is mapped identically to host physical memory of the host device and may therefore avoid or reduce address translations between guest physical memory and host physical memory.

VM data structure associating module 520 may enable the processing device to associate the computing process with a virtual machine data structure. In one example, the virtual machine data structure may be a virtual machine control structure (VMCS) that is configured to pass accesses to the processor and avoid exiting to a hypervisor. The computing process may be capable of initiating an update to the virtual machine data structure to cause the processor to switch between the first page table structure 152A and the second page table structure 152B. The first page table structure 152A and the second page table structure 152B may each comprise a host page table structure comprising an identical (e.g., one-to-one) mapping between a guest physical memory address and a host physical memory address.

Code loading module 530 may enable the processing device to load the first executable code 117A and the second executable code 117B into the user space memory of the computing process. The first page table structure 152A may include mapping data for the first executable code 117A and for the second executable code 117B. First executable code 117A may be application code that includes a call to second executable code 117B, which includes driver code of a device (e.g., physical or virtual network device). The first page table structure may be absent mapping data to access the device and the second page table may include mapping data to access the device.

Page table updating module 540 may enable the processing device to update second page table structure 152B to disable execution of the first executable code 117A and to map a portion of the user space memory to the device. The first page table structure may include mapping data for the application code in a first region of guest physical memory and the second page table structure may include mapping data for the same application code in a second region of guest physical memory. The application code in the first region of physical memory may be executable and the application code in the second region of guest physical memory may be non-executable. The process may switch to the second page table structure 152B to enable the second executable code 117B to execute and access the device. In one example, the driver code in the user space memory (e.g., second executable code 117B) invokes the instruction to switch to the second page table structure 152B to gain access to the device and invokes the instruction again to switch to the first page table structure 152A to restrict access to the device. In this example, the first executable code 117A may be absent a call to the switch instruction and the second executable code may call it at least two or more times.

Memory restriction module 550 may enable the processing device to restrict the first executable code 117A from accessing the device. Restricting the first executable code 117A from accessing the portion of user space memory mapped to the device may involve the processor generating an error in response to the first executable code 117A attempting to run after the switch to the second page table structure 152B.

Figure 6:
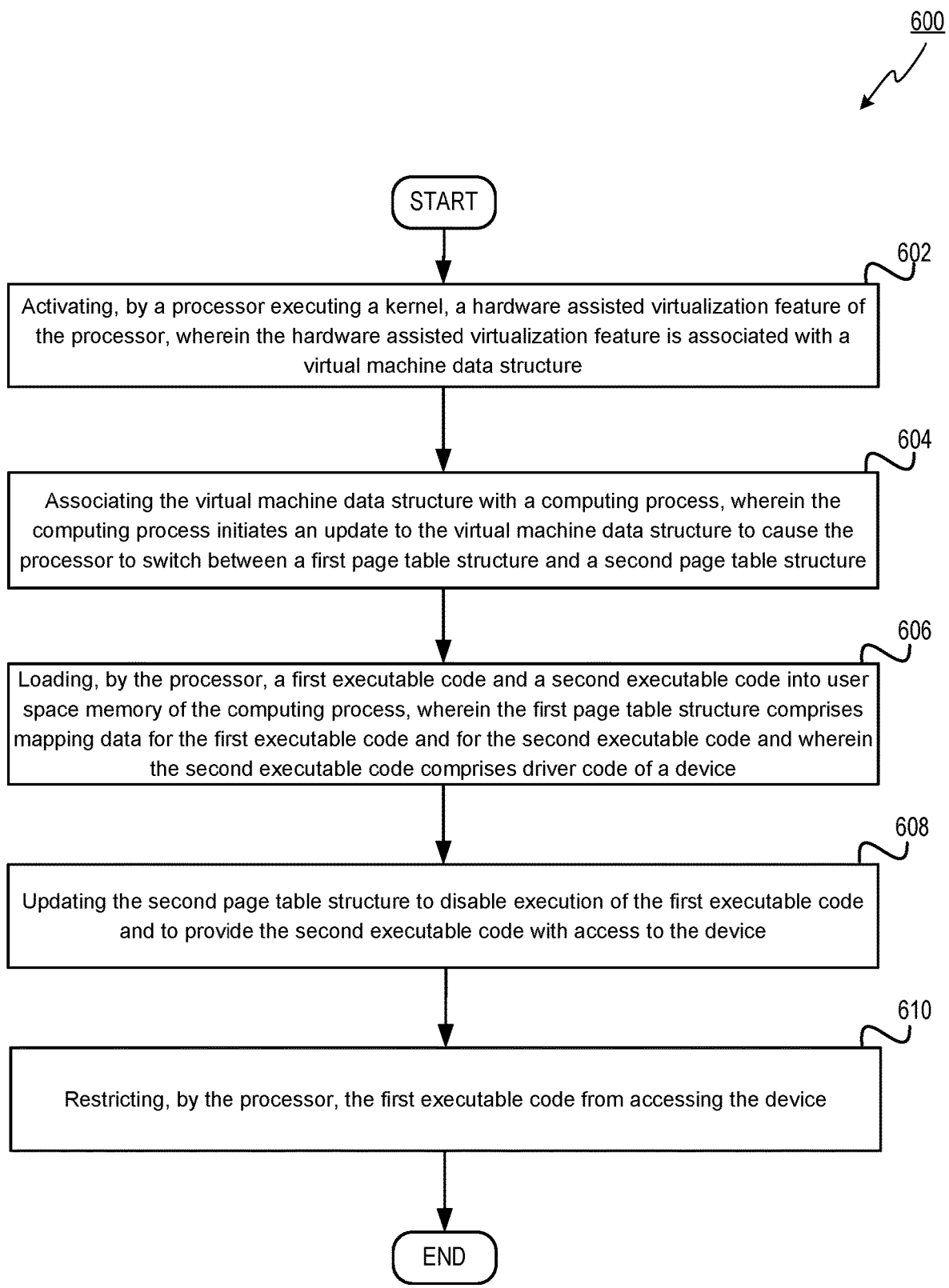
FIG. 6 depicts a flow diagram of another example method for enabling a processor to provide enhanced memory protection for memory resources, in accordance with one or more aspects of the present disclosure.

FIG. 6 depicts a flow diagram of an illustrative example of a method 600 that enables a hypervisor to determine the instruction executed by the virtual machine that caused a transition event, in accordance with one or more aspects of the present disclosure. Method 600 may be similar to method 400 and may be performed in the same or a similar manner as described above in regards to FIG. 3. Method 600 may be performed by processing devices of a server device or a client device and may begin at block 602.

At block 602, the processor may activate a hardware assisted virtualization feature of a processor. Then the hardware assisted virtualization feature may be associated with a virtual machine data structure. The hardware assisted virtualization feature may include a processor instruction to update a page table pointer of the processor from a first page table structure to the second page table structure. In one example, the processor may include one or more Intel® x86 processors and the hardware assisted virtualization feature may be virtual machine extensions (VMX). The processor instruction may be a virtual machine function (VMFUNC) that switches an Extended Page Table Pointer (EPTP) of the Intel x86 processor from the first page table structure to the second page table structure.

At block 604, the processor may associate a computing process with the virtual machine data structure. This may enable the computing process to execute in a shallow virtual machine or as a shallow virtual machine on a host device that is absent a hypervisor. The shallow virtual machine may include guest physical memory that is mapped identically to host physical memory of the host device and may therefore avoid or reduce address translations between guest physical memory and host physical memory. In one example, the virtual machine data structure may be a virtual machine control structure (VMCS) that is configured to pass accesses to the processor and avoid exiting to a hypervisor. The computing process may be capable of initiating an update to the virtual machine data structure to cause the processor to switch between the first page table structure and the second page table structure. The first page table structure and the second page table structure may each comprise a host page table structure comprising a one-to-one mapping between a guest physical memory address and a host physical memory address.

At block 606, the processor may load the first executable code and the second executable code into the user space memory of the computing process. The first page table structure may include mapping data for the first executable code and for the second executable code. The first executable code may be application code that includes a call to the second executable code, which includes driver code of a device (e.g., physical or virtual network device). The first page table structure may be absent mapping data to access the device and the second page table may include mapping data to access the device.

At block 608, the processor may update the second page table structure to disable execution of the first executable code and to provide the second executable code with access to the device. The first page table structure may include mapping data for the application code in a first region of guest physical memory and the second page table structure may include mapping data for the same application code in a second region of guest physical memory. The application code in the first region of physical memory may be executable and the application code in the second region of guest physical memory may be non-executable. The process may switch to the second page table structure to enable the second executable code to execute and access the device. In one example, the driver code in the user space memory (e.g., second executable code) invokes the instruction to switch to the second page table to gain access to the device and invokes the instruction again to switch to the first page table to restrict access to the device. In this example, the first executable code may be absent a call to the switch instruction and the second executable code may call it at least two or more times.

At block 610, the processor may restrict the first executable code from accessing the device. Restricting the first executable code from accessing the device may involve the processor generating an error in response to the first executable code attempting to run after the switch to the second page table structure. Responsive to completing the operations described herein above with references to block 610, the method may terminate.

Figure 7:
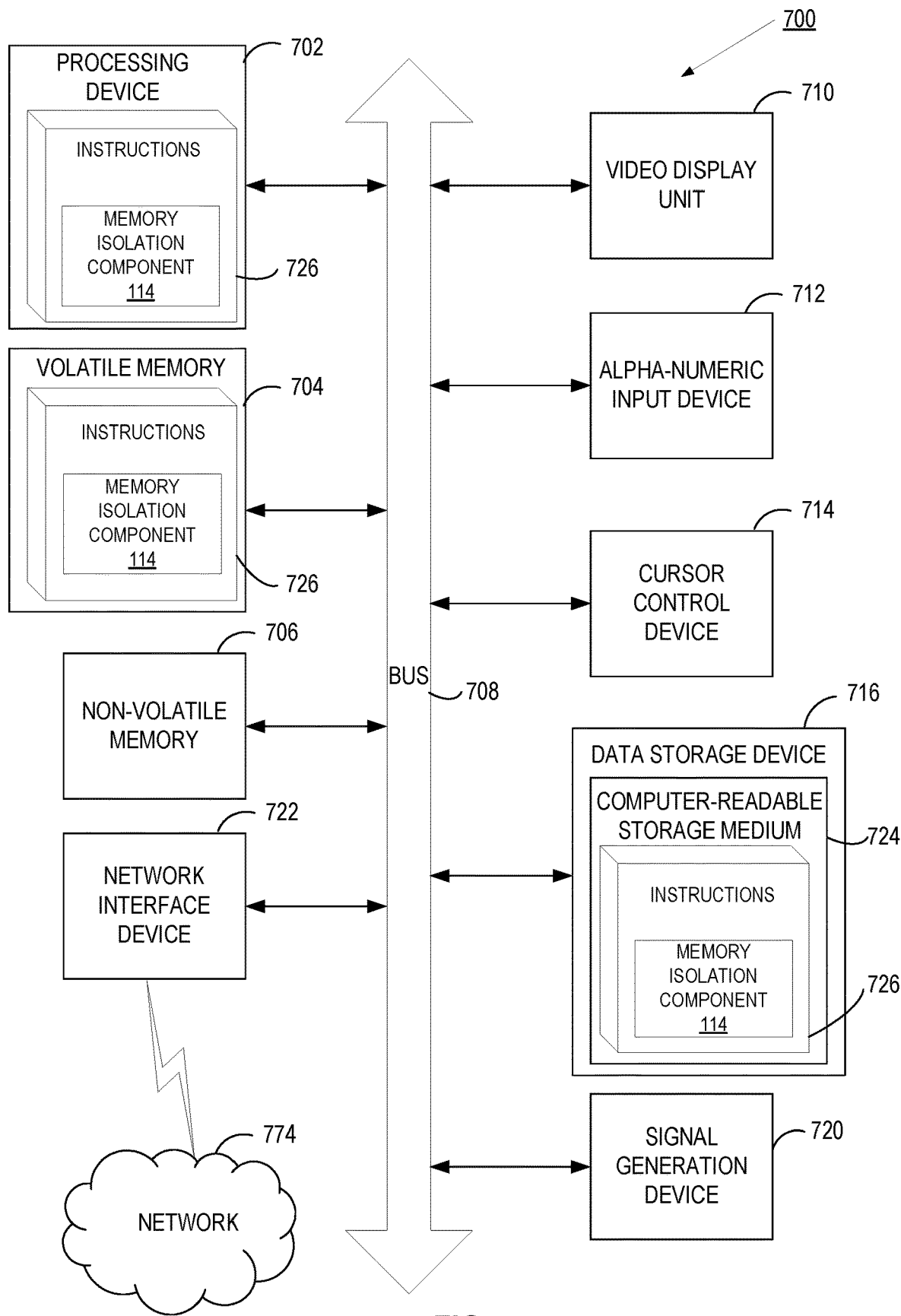
FIG. 7 depicts a block diagram of an illustrative computing device operating in accordance with the examples of the present disclosure.

FIG. 7 depicts a block diagram of a computer system operating in accordance with one or more aspects of the present disclosure. In various illustrative examples, computer system 700 may correspond to computing system 100 of FIG. 1. The computer system may be included within a data center that supports virtualization. Virtualization within a data center results in a physical system being virtualized using virtual machines to consolidate the data center infrastructure and increase operational efficiencies. A virtual machine (VM) may be a program-based emulation of computer hardware. For example, the VM may operate based on computer architecture and functions of computer hardware resources associated with hard disks or other such memory. The VM may emulate a physical computing environment, but requests for a hard disk or memory may be managed by a virtualization layer of a computing device to translate these requests to the underlying physical computing hardware resources. This type of virtualization results in multiple VMs sharing physical resources.

In certain implementations, computer system 700 may be connected (e.g., via a network, such as a Local Area Network (LAN), an intranet, an extranet, or the Internet) to other computer systems. Computer system 700 may operate in the capacity of a server or a client computer in a client-server environment, or as a peer computer in a peer-to-peer or distributed network environment. Computer system 700 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 700 may include a processing device 702, a volatile memory 704 (e.g., random access memory (RAM)), a non-volatile memory 706 (e.g., read-only memory (ROM) or electrically-erasable programmable ROM (EEPROM)), and a data storage device 716, which may communicate with each other via a bus 708.

Processing device 702 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 700 may further include a network interface device 722. Computer system 700 also may include a video display unit 710 (e.g., an LCD), an alphanumeric input device 712 (e.g., a keyboard), a cursor control device 714 (e.g., a mouse), and a signal generation device 720.

Data storage device 716 may include a non-transitory computer-readable storage medium 724 on which may store instructions 726 encoding any one or more of the methods or functions described herein, including instructions for implementing method 300 or 500 and for memory isolation component 114 of FIGS. 1 and 2.

Instructions 726 may also reside, completely or partially, within volatile memory 704 and/or within processing device 702 during execution thereof by computer system 700, hence, volatile memory 704, and processing device 702 may also constitute machine-readable storage media.

While computer-readable storage medium 724 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer and cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware resources. Further, the methods, components, and features may be implemented in any combination of hardware resources and computer program components, or in computer programs.

Unless specifically stated otherwise, terms such as "initiating," "transmitting," "receiving," "analyzing," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. In addition, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform methods 300 and/or each of its individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method comprising:
receiving, by a processor of a host device, a request to create a computing process comprising a first executable code and a second executable code, wherein the computing process is associated with a guest memory address space that is mapped to a host memory address space of the host device such that each guest physical address of the guest memory address space is identical to a corresponding host physical address of the host memory address space;
associating the computing process with a virtual machine data structure, wherein the computing process initiates an update to the virtual machine data structure to cause the processor to switch between a first page table structure and a second page table structure;
loading, by the processor, the first executable code and the second executable code into memory of the host device, wherein the first page table structure comprises mapping data for the first executable code and for the second executable code and wherein the second executable code comprises driver code of a device;
updating the second page table structure to disable execution of the first executable code and to provide the second executable code with access to the device; and
restricting, by the processor, the first executable code from accessing the device.

2. The method of claim 1, wherein the computing process is executed by a shallow virtual machine executing on the host device without a hypervisor.

3. The method of claim 1, further comprising activating, by a kernel, a hardware assisted virtualization feature of the processor, wherein the hardware assisted virtualization feature comprises a processor instruction to update a page table pointer of the processor from the first page table structure to the second page table structure.

4. The method of claim 3, wherein the driver code comprises a first call to the processor instruction to switch to the second page table structure to provide access to the device and comprises a second call to the processor instruction to switch to the first page table structure to restrict access to the device.

5. The method of claim 3, wherein the processor instruction comprises a virtual machine function (VMFUNC) that switches an extended page table pointer (EPTP) from the first page table structure to the second page table structure.

6. The method of claim 1, wherein the first page table structure comprises mapping data for application code in a first region of the guest memory address space and, wherein the second page table structure comprises mapping data for the application code in a second region of the guest memory address space, wherein the application code in the first region of the guest memory address space is executable and the application code in the second region of the guest memory address space is non-executable.

7. The method of claim 1, wherein restricting the first executable code from accessing the device comprises the processor generating an error in response to the first executable code attempting to run after switching to the second page table structure.

8. The method of claim 1, further comprising enabling the second executable code to access a portion of the guest memory address space mapped to the device in response to initiating the update to switch the first page table structure to the second page table structure.

9. The method of claim 3, wherein the processor comprises one or more x86 processors and wherein the hardware assisted virtualization feature comprises virtual machine extensions (VMX).

10. A system comprising:
a memory;
a processor operatively coupled to the memory, wherein the processor to:
receive a request to create a computing process comprising a first executable code and a second executable code, wherein the computing process is associated with a guest memory address space that is mapped to a host memory address space of a host device such that each guest physical address of the guest memory address space is identical to a corresponding host physical address of the host memory address space;
associate the computing process with a virtual machine data structure, wherein the computing process initiates an update to the virtual machine data structure to cause the processor to switch between a first page table structure and a second page table structure;
load the first executable code and the second executable code into the memory, wherein the first page table structure comprises mapping data for the first executable code and for the second executable code and wherein the second executable code comprises driver code of a device;
update the second page table structure to disable execution of the first executable code and to provide the second executable code with access to the device; and
restrict the first executable code from accessing the device.

11. The system of claim 10, wherein the computing process is executed by a shallow virtual machine running on the system without a hypervisor.

12. The system of claim 10, wherein the processor comprises a hardware assisted virtualization feature that comprises a processor instruction to update a page table pointer of the processor from the first page table structure to the second page table structure.

13. The system of claim 12, wherein the driver code comprises a first call to the processor instruction to switch to the second page table structure to provide access to the device and comprises a second call to the processor instruction to switch to the first page table structure to restrict access to the device.

14. The system of claim 10, wherein the first page table structure comprises mapping data for application code in a first region of the guest memory address space and the second page table structure comprises mapping data for the application code in a second region of the guest memory address space, wherein the application code in the first region of the guest memory address space is executable and the application code in the second region of the guest memory address space is non-executable.

15. A non-transitory machine-readable storage medium storing instructions that cause a processor of a host device to:
- activate a hardware assisted virtualization feature of the processor, wherein the hardware assisted virtualization feature is associated with a virtual machine data structure;
- associate the virtual machine data structure with a computing process that comprises a first executable code and a second executable code, wherein the computing process initiates an update to the virtual machine data structure to cause the processor to switch between a first page table structure and a second page table structure, and wherein the computing process is associated with a guest memory address space that is mapped to a host memory address space of the host device such that each guest physical address of the guest memory address space is identical to a corresponding host physical address of the host memory address space;
- load the first executable code and the second executable code into a memory of the host device, wherein the first page table structure comprises mapping data for the first executable code and for the second executable code and wherein the second executable code comprises driver code of a device;
- update the second page table structure to disable execution of the first executable code and to provide the second executable code with access to the device; and
- restrict the first executable code from accessing device.

16. The non-transitory machine-readable storage medium of claim 15, wherein the computing process is executed in a shallow virtual machine on the host device that is absent a hypervisor.

17. The non-transitory machine-readable storage medium of claim 15, wherein the hardware assisted virtualization feature comprises a processor instruction to update a page table pointer of the processor from the first page table structure to the second page table structure.

* * * * *